(12) United States Patent
Ichiba et al.

(10) Patent No.: US 11,561,328 B2
(45) Date of Patent: Jan. 24, 2023

(54) PHOSPHOR PROTECTION FILM, WAVELENGTH CONVERSION SHEET, AND LIGHT-EMITTING UNIT

(71) Applicant: TOPPAN PRINTING CO., LTD., Tokyo (JP)

(72) Inventors: Hiroki Ichiba, Tokyo (JP); Kei Tsuruzoe, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 472 days.

(21) Appl. No.: 16/270,451

(22) Filed: Feb. 7, 2019

(65) Prior Publication Data
US 2019/0187338 A1 Jun. 20, 2019

Related U.S. Application Data

(63) Continuation of application No. PCT/JP2017/028758, filed on Aug. 8, 2017.

(30) Foreign Application Priority Data

Aug. 12, 2016 (JP) .............................. JP2016-158594

(51) Int. Cl.
*G02B 1/14* (2015.01)
*G02B 5/20* (2006.01)
(Continued)

(52) U.S. Cl.
CPC .................. *G02B 1/14* (2015.01); *B32B 7/12* (2013.01); *B32B 27/36* (2013.01); *G02B 1/11* (2013.01);
(Continued)

(58) Field of Classification Search
CPC .......... G02B 1/14; G02B 5/206; G02B 5/202; G02B 6/005; G02B 1/11; G02B 1/16;
(Continued)

(56) References Cited

U.S. PATENT DOCUMENTS

2009/0297860 A1* 12/2009 Sasaki ................... B32B 27/302
428/423.7
2010/0015431 A1 1/2010 Matsui et al.
(Continued)

FOREIGN PATENT DOCUMENTS

JP 2011-013567 A 1/2011
JP 2012-096551 A 5/2012
(Continued)

OTHER PUBLICATIONS

International Searching Authority, "International Search Report," issued in connection with International Patent Application No. PCT/JP2017/028758, dated Oct. 24, 2017.
International Searching Authority, "Written Opinion," issued in connection with International Patent Application No. PCT/JP2017/028758, dated Oct. 24, 2017.

*Primary Examiner* — Anthony J Frost
(74) *Attorney, Agent, or Firm* — Foley & Lardner LLP

(57) ABSTRACT

A phosphor protection film for protecting phosphors contained in a phosphor layer. The phosphor protection film includes a functional layer, a bulking layer that has a single-layer structure or a laminated structure, and a first vapor deposited layer (gas barrier layer) that has gas barrier properties in this order from outside to inside. The clearance between the functional layer and the first vapor deposited layer in the thickness direction of the phosphor protection film is 45 to 280 μm.

18 Claims, 11 Drawing Sheets

(51) Int. Cl.
*G02B 1/11* (2015.01)
*G02B 1/16* (2015.01)
*B32B 7/12* (2006.01)
*B32B 27/36* (2006.01)
*F21V 8/00* (2006.01)

(52) U.S. Cl.
CPC ............... *G02B 1/16* (2015.01); *G02B 5/202* (2013.01); *G02B 5/206* (2013.01); *G02B 6/005* (2013.01); *B32B 2264/102* (2013.01); *B32B 2307/306* (2013.01); *B32B 2307/412* (2013.01); *G02B 6/0073* (2013.01)

(58) Field of Classification Search
CPC .. G02B 6/0073; G02B 6/0065; G02B 6/0093; G02B 5/20; B32B 7/02; B32B 7/12; B32B 27/36; B32B 2264/102; B32B 2307/306; B32B 2307/412; B32B 7/023; B32B 27/08; B32B 27/20; B32B 2307/7242; B32B 2307/422; B32B 2255/10; B32B 2255/20
See application file for complete search history.

(56) References Cited

U.S. PATENT DOCUMENTS

| | | | |
|---|---|---|---|
| 2012/0113672 A1* | 5/2012 | Dubrow | G02B 6/0073 362/602 |
| 2012/0315462 A1 | 12/2012 | Matsui et al. | |
| 2013/0022827 A1* | 1/2013 | Imai | C08K 5/544 428/446 |
| 2015/0099126 A1 | 4/2015 | Honda | |
| 2015/0340641 A1* | 11/2015 | Kuroki | C07F 7/0814 257/40 |
| 2017/0320306 A1* | 11/2017 | Iwase | B32B 7/12 |

FOREIGN PATENT DOCUMENTS

| | | | | |
|---|---|---|---|---|
| JP | 2012-183823 A | | 9/2012 | |
| JP | 2012-250181 A | | 12/2012 | |
| JP | 2013-251191 A | | 12/2013 | |
| JP | WO2013-161894 A1 | | 12/2015 | |
| JP | 5900720 B1 | | 4/2016 | |
| JP | 2016-141050 A | | 8/2016 | |
| JP | 2016141050 A | * | 8/2016 | ............ B32B 27/18 |
| WO | WO-2016/010116 A1 | | 1/2016 | |

* cited by examiner

PHOSPHOR PROTECTION FILM, WAVELENGTH CONVERSION SHEET, AND LIGHT-EMITTING UNIT

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/028758, filed on Aug. 8, 2017, which is based upon and claims the benefit of priority to Japanese Patent Application No. 2016-158594, filed on Aug. 12, 2016; the disclosures of which are all incorporated herein by reference in their entireties.

TECHNICAL FIELD

The present disclosure relates to a phosphor protection film, a wavelength conversion sheet, and a light-emitting unit.

BACKGROUND ART

In light-emitting units, such as backlight units of liquid crystal displays and electroluminescent light-emitting units, phosphors contained in a phosphor layer may come into contact with oxygen or moisture and their performance may thereby be reduced over time. In order to prevent this reduction, these light-emitting units often employ a structure in which a film having gas barrier properties is provided on one or both surfaces of a phosphor layer. For example, PTL 1 discloses a color conversion member having a structure in which both surfaces of each of two color conversion layers containing different types of phosphors are sandwiched between barrier films.

CITATION LIST

[Patent Literature] PTL 1: JP 2011-13567 A

SUMMARY OF THE INVENTION

Technical Problem

Widely used phosphor protection films are laminated films having a support film made of a transparent resin material, and a gas barrier layer formed on a surface of the support film. However, when a gas barrier layer is formed by vapor deposition of an inorganic material (e.g., silicon oxide) on a surface of a support film, small white foreign substances (size: about 0.1 mm to 3 mm), called vapor deposited powder, are sometimes generated on the gas barrier layer. If such foreign substances are present in the phosphor protection film, the foreign substances may be visually recognized as display defects when a display is assembled using this phosphor protection film. Even if the performance of gas barrier properties is not problematic, this portion cannot be used as a product because such foreign substances are visually recognized in the phosphor protection film; thus, waste occurs.

An object of the present disclosure is to provide a phosphor protection film in which even if fine foreign substances, such as vapor deposited powder, are present in a gas barrier layer, the foreign substances are less likely to be visually recognized as defects. Another object of the present disclosure is to provide a wavelength conversion sheet having the above phosphor protection film, and a light-emitting unit including the same.

Desired Solution to Problem

One aspect of the present disclosure relates to a phosphor protection film for protecting phosphors contained in a phosphor layer. The phosphor protection film includes a functional layer, a bulking layer that has a single-layer structure or a laminated structure, and a first vapor deposited layer that has gas barrier properties, in this order from outside to inside, where the clearance between the functional layer and the first vapor deposited layer in the thickness direction of the phosphor protection film is 45 to 280 µm. The "inside" of the phosphor protection film means a side on which the phosphor layer to be protected by the phosphor protection film is disposed, and the "outside" means the opposite side.

In the above phosphor protection film, the bulking layer is interposed between the functional layer and the first vapor deposited layer, which constitutes a gas barrier layer, and the functional layer and the gas barrier layer are separated at a predetermined distance (45 to 280 µm). The use of such a structure exhibits the effect that even if foreign substances that are not problematic for performance are present in the first vapor deposited layer, when a display is assembled using the phosphor protection film, and the presence of display defects is observed from the functional layer side (outside), the foreign substances in the first vapor deposited layer are less likely to be visually recognized as defects. In terms of making the above foreign substances less visible, the haze value of a laminate having the functional layer and the bulking layer is preferably 10% or more. Haze value is an index indicating the turbidity of a film or laminate, and is a ratio of diffuse transmitted light to total transmitted light. The haze value is specifically determined by the following formula. In the following formula, Td represents diffuse transmittance, and Tt represents total light transmittance. The diffused transmittance and total light transmittance can be each measured by a haze meter or the like.

$$\text{Haze value (\%)} = Td/Tt \times 100$$

When a bulking layer having a laminated structure is employed, the bulking layer preferably includes a resin film for bulking having a thickness of 10 to 250 µm. When a bulking layer having a single-layer structure is employed, a film having a thickness of 45 to 280 µm may be used singly as the resin film for bulking.

When the bulking layer has a multilayer structure including a resin film for bulking, the bulking layer may include a resin film for bulking having a thickness of 10 to 250 µm, a first resin film having a thickness of 9 to 50 µm in which the first vapor deposited layer is formed on an inner surface thereof, and a first adhesion layer that bonds together an inner surface of the resin film for bulking and an outer surface of the first resin film (see FIG. 1).

The first resin film does not need to necessarily configure a portion of the bulking layer. For example, the phosphor protection film of the present disclosure may have a structure further including a first resin film having a thickness of 9 to 50 µm in which the first vapor deposited layer is formed on an outer surface thereof, and a first adhesion layer interposed between the first vapor deposited layer and the resin film for bulking (see FIG. 3).

The phosphor protection film of the present disclosure may have a structure further having, inside the first vapor deposited layer, a second adhesion layer, a second vapor deposited layer that has gas barrier properties, and a second resin film in this order from outside to inside (see FIGS. 1 and 3).

The functional layer preferably has at least one function selected from the group consisting of an interference fringe prevention function, an antireflection function, a light scattering function, an antistatic function, and a damage prevention function.

From the viewpoint that the phosphor protection film achieves more excellent barrier properties, at least one of the first adhesion layer and the second adhesion layer preferably has an oxygen permeability of 1000 $cm^3/(m^2\text{-day-atm})$ or less at a thickness of 5 μm.

One aspect of the present disclosure relates to a wavelength conversion sheet including a phosphor layer containing phosphors, and a pair of protection films arranged so as to sandwich the phosphor layer. Specifically, the wavelength conversion sheet includes a first protection film having the above phosphor protection film, a phosphor layer containing phosphors, and a second protection film having the above phosphor protection film, which are laminated in this order, where the first protection film and the second protection film are arranged so that their inner surfaces face each other. The wavelength conversion sheet having such a structure exhibits the effect that even if foreign substances that are so small that they are not problematic for performance are present in the first vapor deposited layer of the phosphor protection film, when a display is assembled using the wavelength conversion sheet, and the presence of display defects is observed from the functional layer side (outside), the foreign substances are less likely to be visually recognized as defects.

One aspect of the present disclosure relates to a light-emitting unit including a light source, a light guide plate, and the above wavelength conversion sheet. The light-emitting unit including the above wavelength conversion sheet exhibits the effect that even if foreign substances that are so small that they are not problematic for performance are present in the first vapor deposited layer of the phosphor protection film, when the presence of display defects is observed from the functional layer side (outside) of the phosphor protection film, the foreign substances are less likely to be visually recognized as defects.

Desired Advantageous Effects of the Invention

The present disclosure attempts to provide a phosphor protection film in which even if foreign substances, called vapor deposited powder, are present in a gas barrier layer, the foreign substances are less likely to be visually recognized as defects. Moreover, the present disclosure provides a wavelength conversion sheet including the above phosphor protection film, and a light-emitting unit including the same.

DESCRIPTION OF REPRESENTATIVE EMBODIMENTS

Figure 1:
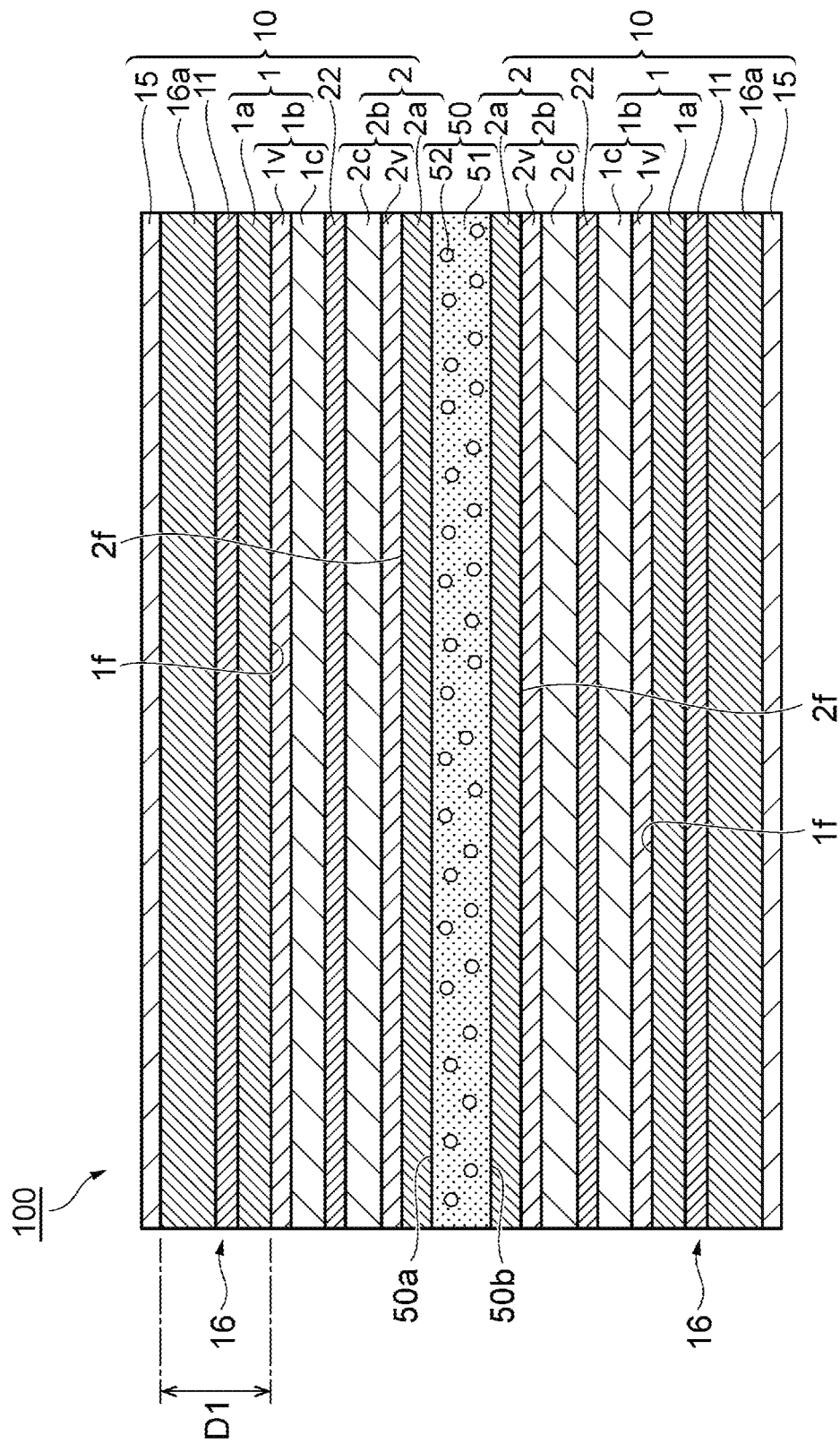
FIG. 1 is a schematic cross-sectional view showing a first embodiment of the wavelength conversion sheet of the present disclosure.

Embodiments of the present disclosure are described in detail below with reference to the drawings. The present invention is not limited to the following representative embodiments, and appropriate modifications can be made without departing from the spirit of the present invention. The representative embodiments described below are merely examples of the present invention, and the design thereof could be appropriately changed by one skilled in the art. In the drawings referred to in the following description, for clarity, characteristic parts are enlarged, and thus the components are not shown to scale. In the drawings, the same reference signs are assigned to the same or corresponding parts, and redundant description is omitted. Moreover, the positional relationships, such as up and down, left and right, are based on the positional relationships shown in the drawings, unless otherwise specified. Furthermore, the dimension ratios in the drawings are not limited to the ratios shown therein.

<Wavelength Conversion Sheet>

FIG. 1 is a schematic cross-sectional view showing the first embodiment of the wavelength conversion sheet. The wavelength conversion sheet 100 shown in this drawing contains phosphors, such as quantum dots, and can be used, for example, in a backlight unit (light-emitting unit) for LED wavelength conversion.

As shown in FIG. 1, the wavelength conversion sheet 100 includes a phosphor layer 50, and protection films (phosphor protection films) 10 and 10 each provided on one surface 50a side of the phosphor layer 50 and the other surface 50b side. In the wavelength conversion sheet 100, the phosphor layer 50 is wrapped (i.e., sealed) between a pair of the protection films 10 and 10.

Figure 2:
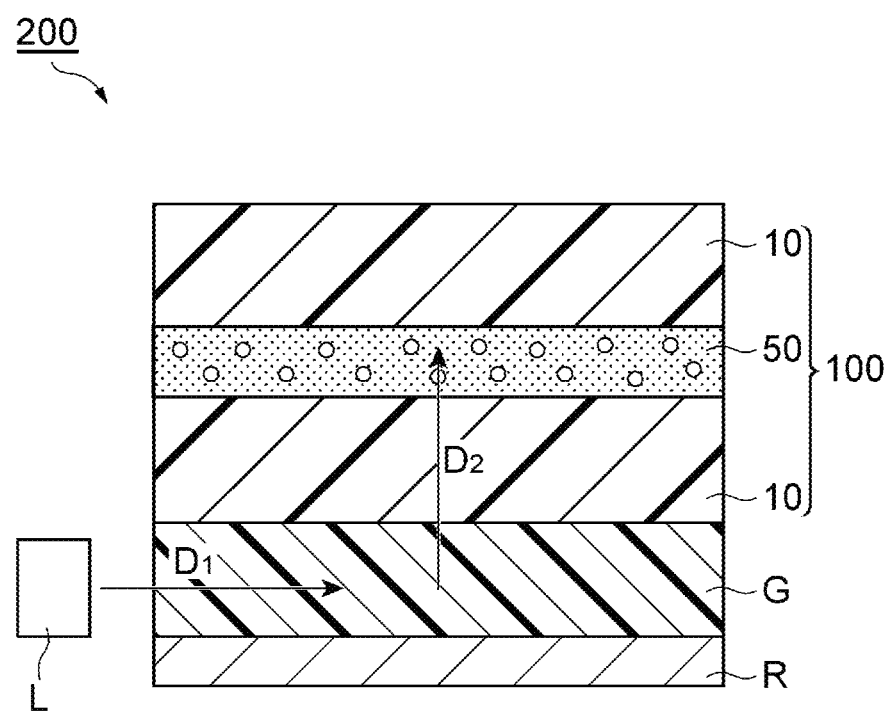
FIG. 2 is a schematic cross-sectional view showing an example of a backlight unit obtained using the wavelength conversion sheet shown in FIG. 1.

FIG. 2 is a schematic cross-sectional view showing an example of a backlight unit obtained using the wavelength conversion sheet 100. The backlight unit 200 shown in this drawing includes a light source L, a light guide plate G, and the wavelength conversion sheet 100. Specifically, the light guide plate G and a reflection plate R are arranged in this order on the surface of the backlight unit 200 on one protection film 10 side, and the light source L is arranged in a lateral direction of the light guide plate G. The thickness of the light guide plate G is 100 to 1000 μm, for example.

The light guide plate G and the reflection plate R efficiently reflect light emitted from the light source L and guide the light to the phosphor layer 50. Examples of the light guide plate G that can be used include acrylic, polycarbonate, and cycloolefin films. The light source L is provided with, for example, a plurality of blue light-emitting diode elements. The light-emitting diode elements may be purple light-emitting diodes or shorter wavelength light-emitting diodes. Light emitted from the light source L enters the light guide plate G ($D_1$ direction) and then enters the phosphor layer 50 ($D_2$ direction) due to reflection, refraction, etc.

Light passing through the phosphor layer 50 becomes white light because light before passing through the phosphor layer 50 is mixed with yellow light (possibly a mixture of red light and green light) generated in the phosphor layer 50. Since the performance of the phosphor layer 50 may be reduced due to contact with oxygen or moisture over a long period of time, the phosphor layer 50 is protected by a pair of the protection films 10 and 10, as shown in FIGS. 1 and 2. Each layer constituting the wavelength conversion sheet 100 is described in detail below.

(Phosphor Layer)

The phosphor layer 50 is a thin film having a thickness of several tens to several hundreds of μm and containing a sealing resin 51 and phosphors 52, as shown in FIG. 1. A mixture of one or more types of phosphors 52 is sealed inside the sealing resin 51. When the phosphor layer 50 and a pair of the protection films 10 and 10 are laminated, the sealing resin 51 bonds them together and fills gaps between them. The phosphor layer 50 may include two or more laminated phosphor layers in which only one type of phosphor 52 is sealed. For two or more types of phosphors 52 used in such one or more phosphor layers, those having the same excitation wavelength are selected. The excitation wavelength is selected based on the wavelength of light emitted from the light source L. The fluorescent colors of two or more types of phosphors 52 are different from each other. When two types of phosphors 52 are used, their fluorescent colors are preferably red and green. Each fluorescence wavelength and the wavelength of light emitted from the light source L are selected based on the spectral characteristics of the color filter. The fluorescence peak wavelength is, for example, 650 nm for red, and 550 nm for green.

Examples of the sealing resin 51 that can be used include thermoplastic resins, thermosetting resins, ultraviolet-curing resins, and the like. These resins can be used singly or in combination of two or more.

Examples of thermoplastic resins include cellulose derivatives, such as acetyl cellulose, nitrocellulose, acetyl butyl cellulose, ethyl cellulose, and methyl cellulose; vinyl-based resins, such as vinyl acetate and copolymers thereof, vinyl chloride and copolymers thereof, and vinylidene chloride and copolymers thereof; acetal resins, such as polyvinyl formal and polyvinyl butyral; acrylic-based resins, such as acrylic resins and copolymers thereof, and methacrylic resins and copolymers thereof; polystyrene resins; polyamide resins; linear polyester resins; fluororesins; polycarbonate resins; and the like.

Examples of thermosetting resins include phenol resins, urea melamine resins, polyester resins, silicone resins, and the like.

Examples of ultraviolet-curing resins include photopolymerizable prepolymers, such as epoxy acrylate, urethane acrylate, and polyester acrylate. Furthermore, such a photopolymerizable prepolymer can be used as a main component, and a monofunctional or multifunctional monomer can be used as a diluent.

The phosphors 52 are preferably quantum dots. Examples of quantum dots include those in which a core as a light-emitting part is coated with a shell as a protective film. The core is, for example, cadmium selenate (CdSe) or the like, and the shell is, for example, zinc sulfide (ZnS) or the like. Surface defects of CdSe particles are coated with ZnS, which has a large bandgap, to thereby improve the quantum efficiency. Moreover, the phosphors 52 may be those in which a core is doubly coated with a first shell and a second shell. In this case, the core can be CdSe, the first shell can be zinc selenide (ZnSe), and the second shell can be ZnS. Furthermore, phosphors 52 other than quantum dots may be YAG:Ce or the like.

The mean particle size of the phosphors 52 is preferably 1 to 20 nm. The thickness of the phosphor layer 50 is preferably 1 to 500 μm. The content of the phosphors 52 in the phosphor layer 50 is preferably 1 to 20 mass %, and more preferably 3 to 10 mass %, relative to the total amount of the phosphor layer 50.

(Protection Film)

As shown in FIG. 1, the protection film 10 includes at least a coating layer (functional layer) 15, a bulking layer 16, and a first vapor deposited layer 1v that has gas barrier properties in this order from outside (the side furthest from the phosphor layer 50) to inside (the side close to the phosphor layer 50). The clearance (distance D1 in FIG. 1) between the coating layer 15 and the first vapor deposited layer 1v in the thickness direction of the protection film 10 is preferably 45 to 280 μm. With the clearance of 45 μm or more, the effect of making foreign substances invisible can be sufficiently ensured. With the clearance of 280 μm or less, it is easy to suppress the total thickness of the wavelength conversion sheet 100 from overly increasing, and to suppress decrease in productivity. The upper limit of the clearance may be further selected depending on the use. For example, the clearance is more preferably 45 to 90 μm for mobile devices for which less thickness is required, and more preferably 45 to 120 μm for televisions. In the present embodiment, the bulking layer 16 has a laminated structure, as shown in FIG. 1, and includes a resin film 16a for bulking, a first adhesion layer 11, and a first resin film 1a. The thickness of the bulking layer 16 is equal to the distance D1 shown in FIG. 1.

The present embodiment exhibits the following effect because the bulking layer 16 having the above thickness is interposed between the coating layer 15, which forms the outermost layer, and the first vapor deposited layer 1v. Specifically, the exhibited effect is such that even if foreign substances (e.g., vapor deposited powder) that are so small that they are not problematic for performance are present in the first vapor deposited layer 1v, when a display is assembled using the protection film 10, and the presence of display defects is observed from the coating layer 15 side (outside), the foreign substances in the first vapor deposited layer 1v are less likely to be visually recognized as defects.

The structure of the protection film 10 of the present embodiment is described in more detail below. The protection film 10 includes a coating layer 15, a resin film 16a for bulking, a first barrier film 1, a second barrier film 2, a first adhesion layer 11 that bonds together the resin film 16a for bulking and the first barrier film 1, and a second adhesion layer 22 that bonds together the first barrier film 1 and the second barrier film 2. As shown in FIG. 1, the barrier film on the side (outside) far from the phosphor layer 50 is regarded as the first barrier film 1, and the barrier film on the side (inside) close to the phosphor layer 50 is regarded as the second barrier film 2. The first barrier film 1 has a first resin film 1a and a first barrier layer 1b provided on one surface 1f of the first resin film 1a. The second barrier film 2 has a second resin film 2a and a second barrier layer 2b provided on one surface 2f of the second resin film 2a.

The two barrier films 1 and 2 are laminated so that the barrier layer 1b of the first barrier film 1 and the barrier layer 2b of the second barrier film 2 face (are opposite to) each other through the first adhesion layer 11. In other words, the surface 1f of the first resin film 1a and the surface 2f of the second resin film 2a face each other, and the two barrier layers 1b and 2b are sandwiched between the first resin film 1a and the second resin film 2a.

The first resin film 1a and the second resin film 2a are preferably, but not limited to, films having a total light transmittance of 85% or more. For example, polyethylene terephthalate films, polyethylene naphthalate films, etc., can be used as films that have high transparency and excellent heat resistance. The thickness of each of the first resin film 1a and the second resin film 2a is 9 to 50 μm, and preferably 12 to 30 μm. With the thickness of the resin films 1a and 2a being 9 μm or more, the strength of the resin films 1a and 2a can be sufficiently ensured. With the thickness of the resin films 1a and 2a being 50 μm or less, long rolls (rolls of the barrier films 1 and 2) can be produced efficiently and economically.

The thickness of the first resin film 1a and the thickness of the second resin film 2a may be the same or different as long as they are both within the range of 9 to 50 μm. In terms of further reducing the thickness of the wavelength conversion sheet 100, the thickness of the second resin film 2a on the side closer to the phosphor layer 50 may be less than that of the first resin film 1a on the side further from the phosphor layer 50. Since moisture and gas penetrate from the surface of the wavelength conversion sheet 100, the thickness of the first resin film 1a can be relatively increased to prevent the penetration of moisture and oxygen from the surface, and the thickness of the second resin film 2a can be relatively reduced to reduce the total thickness of the wavelength conversion sheet 100. The penetration of moisture and oxygen occurs not only from the surfaces of the barrier films 1 and 2, but also from their end surfaces; thus, the entrance of moisture and oxygen from the end surfaces can be suppressed when the second resin film 2a has a smaller thickness. The thickness of the second resin film 2a is preferably 40 μm or less, and more preferably 25 μm or less.

The first barrier layer 1b contains a first vapor deposited layer 1v and a first gas-barrier covering layer 1c. That is, the first barrier layer 1b has the first vapor deposited layer 1v provided on the surface 1f of the first resin film 1a, and the first gas barrier covering layer 1c provided on the first vapor deposited layer 1v. The second barrier layer 2b contains a second vapor deposited layer 2v and a second gas-barrier covering layer 2c. That is, the second barrier layer 2b has the second vapor deposited layer 2v provided on the surface 2f of the second resin film 2a, and the second gas barrier covering layer 2c provided on the second vapor deposited layer 2v. Although not shown, surface treatment, such as plasma treatment, may be performed on the first resin film 1a and the first vapor deposited layer 1v, and the second resin film 2a and the second vapor deposited layer 2v, in order to improve the adhesion between the layers. Moreover, an anchor coat layer made up of or including an acrylic resin layer, a polyester resin, a urethane resin, or the like may be provided.

The vapor deposited layers 1v and 2v can be formed, for example, by vapor deposition of aluminum oxide, silicon oxide, silicon oxynitride, magnesium oxide, or a mixture thereof on the resin films 1a and 2a. Of these inorganic materials, aluminum oxide or silicon oxide is preferably used, in terms of barrier properties and productivity. The vapor deposited layers are formed by a method, such as vacuum deposition, sputtering, or CVD.

The thickness (film thickness) of each of the first vapor deposited layer 1v and the second vapor deposited layer 2v is preferably in the range of 5 to 500 nm, and more preferably in the range of 10 to 100 nm. When the film thickness is 5 nm or more, there is a tendency that a uniform film can be easily formed, and that the function as a gas barrier material can be more sufficiently achieved. When the film thickness is 500 nm or less, there is a tendency that sufficient flexibility can be maintained owing to such a thin film, and that the formation of cracks in the thin film due to external factors, such as bending and stretching, after film formation can be more reliably prevented. The thickness of the first vapor deposited layer 1v and the thickness of the second vapor deposited layer 2v may be the same or different.

The first gas barrier covering layer 1c and the second gas barrier covering layer 2c are provided to prevent various types of secondary damage in subsequent processes, and to impart high barrier properties. In terms of obtaining excellent barrier properties, these gas barrier covering layers 1c and 2c preferably contain, as a component, at least one member selected from the group consisting of hydroxyl group-containing polymer compounds, metal alkoxides, hydrolyzed metal alkoxides, and polymerized metal alkoxides.

Specific examples of hydroxyl group-containing polymer compounds include water-soluble polymers, such as polyvinyl alcohol, polyvinyl pyrrolidone, and starch. Barrier properties are most excellent particularly when polyvinyl alcohol is used.

Metal alkoxides are compounds represented by the general formula: $M(OR)_n$, where M represents a metal atom, such as Si, Ti, Al, or Zr; R represents an alkyl group, such as $-CH_3$ or $-C_2H_5$; and n represents an integer corresponding to the valence of M. Specific examples include tetraethoxysilane [$Si(OC_2H_5)_4$], triisopropoxy aluminum [$Al(O-iso-C_3H_7)_3$], and the like. Tetraethoxysilane and triisopropoxy aluminum are preferable because they are relatively stable in aqueous solvents after hydrolysis. Moreover, examples of hydrolyzed and polymerized metal alkoxides include silicic acid ($Si(OH)_4$) etc. as hydrolyzed and polymerized tetraethoxysilane, and aluminum hydroxide ($Al(OH)_3$) as hydrolyzed and polymerized tripropoxy aluminum.

The thickness (film thickness) of each of the gas barrier covering layers 1c and 2c is preferably in the range of 50 to 1000 nm, and more preferably in the range of 100 to 500 nm. When the film thickness is 50 nm or more, there is a tendency that more sufficient gas barrier properties can be obtained. When the film thickness is 1000 nm or less, there is a tendency that sufficient flexibility can be maintained owing to such a thin film. The thickness of the first gas barrier covering layer 1c and the thickness of the second gas barrier covering layer 2c may be the same or different.

The first adhesion layer 11 is provided between the resin film 16a for bulking and the barrier film 1 in order to bond together and laminate these films, as shown in FIG. 1. Examples of the adhesive or pressure-sensitive adhesive that constitutes the first adhesion layer 11 include acrylic-based adhesives, epoxy-based adhesives, urethane-based adhesives, and the like. Examples of the pressure-sensitive adhesive include acrylic-based pressure-sensitive adhesives, polyvinyl ether-based pressure-sensitive adhesives, urethane-based pressure-sensitive adhesives, silicone-based pressure-sensitive adhesives, and the like. In particular, acrylic-based pressure-sensitive adhesives are preferable, because they have high transparency and excellent heat resistance. The thickness of the first adhesion layer 11 is preferably 0.5 to 50 µm, more preferably 1 to 20 µm, and even more preferably 2 to 6 µm. With the thickness of the first adhesion layer 11 being 0.5 µm or more, the adhesion to the resin film 16a for bulking and the barrier film 1 is more likely to be obtained. With the thickness of the first adhesion layer 11 being 50 µm or less, better gas barrier properties are more likely to be obtained.

The second adhesion layer 22 is provided between the two barrier films 1 and 2 in order to bond together and laminate these films, as shown in FIG. 1. Examples of the adhesive or pressure-sensitive adhesive that constitutes the second adhesion layer 22 include acrylic-based adhesives, epoxy-based adhesives, urethane-based adhesives, and the like. The adhesive preferably contains an epoxy resin. With an epoxy resin contained in the adhesive, the adhesion to the first barrier film 1 and the second barrier film 2 can be increased. Examples of the pressure-sensitive adhesive include acrylic pressure-sensitive adhesives, polyvinyl ether-based pressure-sensitive adhesives, urethane-based pressure-sensitive adhesives, silicone-based pressure-sensitive adhesives, starch paste-based adhesives, and the like. The thickness of the second adhesion layer 22 is preferably 0.5 to 50 µm, more preferably 1 to 20 µm, and even more preferably 2 to 6 µm. With the thickness of the first adhesion layer 11 being 0.5 µm or more, the adhesion to the first barrier film 1 and the second barrier film 2 is more likely to be obtained. With the thickness of the first adhesion layer 11 being 50 µm or less, better gas barrier properties are more likely to be obtained.

The oxygen permeability of the second adhesion layer 22 is, for example, 1000 $cm^3/(m^2$-day-atm) or less at a thickness of 5 µm in the thickness direction. The above oxygen permeability is preferably 500 $cm^3/(m^2$-day-atm) or less, more preferably 100 $cm^3/(m^2$-day-atm) or less, even more preferably 50 $cm^3/(m^2$-day-atm) or less, and particularly preferably 10 $cm^3/(m^2$-day-atm) or less. With the oxygen permeability of the second adhesion layer 22 being 1000 $cm^3/(m^2$-day-atm) or less, it is possible to obtain a protection film 10 that can suppress dark spots, even if the barrier layers 1b and 2b have defects. The lower limit of the oxygen permeability is not limited, but is 0.1 $cm^3/(m^2$-day-atm), for example. The dark spots mean black spots that are formed, when a light-emitting unit is produced using a protection film containing a barrier film having defects, due to the performance reduction of emitters in the vicinity of the defects. The first adhesion layer 11 may be an adhesive or pressure-sensitive adhesive that has oxygen permeability equivalent to that of the second adhesion layer 22.

The resin film 16a for bulking is not limited, but is preferably a film having a total light transmittance of 85% or more. For example, polyethylene terephthalate films, polyethylene naphthalate films, etc., can be used as films that have high transparency and excellent heat resistance. The thickness of the resin film 16a for bulking is, for example, 10 to 250 µm, preferably 25 to 240 µm, more preferably 40 to 210 µm, and may be 55 to 200 µm. With the thickness of the resin film 16a for bulking being 10 µm or more, the foreign substances in the first vapor deposited layer 1v can be made less visible from the coating layer 15 side. With the thickness of the resin film 16a for bulking being 250 µm or less, it is easy to suppress the total thickness of the wavelength conversion sheet 100 from overly increasing.

The coating layer (functional layer) 15 contains a binder resin and fine particles. The fine particles are embedded in the binder resin so that part of them is exposed from the surface of the coating layer 15. With the above structure, the coating layer 15 has fine irregularities formed on its surface due to the exposed fine particles. A light scattering function can be exhibited because the coating layer 15 is thus provided on the surface of the protection film 10, that is, the surface of the wavelength conversion sheet 100. Due to the combined use of the coating layer 15, which has a light scattering function, and the resin film 16a for bulking, the foreign substances in the first vapor deposited layer 1v can be made less visible by their synergistic effects.

In terms of further making the foreign substances less visible by the above synergistic effects, the haze value of a laminate having the coating layer 15 and the resin film 16a for bulking is preferably 10% or more, more preferably 15% or more, and even more preferably 20% or more. The upper limit of the haze value of the above laminate is 60%, for example. With the haze value of the laminate being 60% or less, reduction in transmittance due to scattering loss can be suppressed.

The surface roughness (arithmetic mean roughness) Ra of the coating layer 15 is preferably 0.2 µm or more. With the surface roughness Ra being 0.2 µm or more, for example, in the case of contact with other members, such as a prism sheet, when a backlight unit is configured, the formation of interference fringes due to close adhesion of the smooth films can be suppressed.

Examples of the binder resin that can be used include thermoplastic resins, thermosetting resins, ultraviolet-curing resins, and the like.

Examples of thermoplastic resins include cellulose derivatives, vinyl-based resins, acetal resins, acrylic-based resins, polystyrene resins, polyamide resins, linear polyester resins, fluororesins, polycarbonate resins, and the like. Examples of cellulose derivatives mentioned above include acetyl cellulose, nitrocellulose, acetyl butyl cellulose, ethyl cellulose, methyl cellulose, and the like. Examples of vinyl-based resins mentioned above include vinyl acetate polymers and copolymers, vinyl chloride polymers and copolymers, vinylidene chloride polymers and copolymers, and the like. Examples of acetal resins mentioned above include polyvinyl formal, polyvinyl butyral, and the like. Examples of acrylic-based resins mentioned above include acrylic-based polymers and copolymers, and methacrylic-based polymers and copolymers, and the like.

Examples of thermosetting resins include phenol resins, urea melamine resins, polyester resins, silicone resins, and the like.

Examples of ultraviolet-curing resins include photopolymerizable prepolymers, such as epoxy acrylate, urethane acrylate, and polyester acrylate. Furthermore, such a photopolymerizable prepolymer can be used as a main component, and a monofunctional or multifunctional monomer can be used as a diluent.

The thickness (film thickness) of the binder resin layer, except for the portion of the coating layer 15 in which the fine particles are exposed, is preferably 0.1 to 20 µm, and more preferably 0.3 to 10 µm. With the film thickness of the binder resin layer being 0.1 µm or more, there is a tendency that a uniform film can be easily obtained, and that optical function can be sufficiently obtained. In contrast, with the film thickness being 20 µm or less, there is a tendency that the fine particles are exposed to the surface of the coating layer 15, whereby an irregularity-imparting effect can be easily obtained. Moreover, transparency can be maintained, and the trend for thinner films can be satisfied.

As the fine particles, organic particles or inorganic particles can be used. Only one type of these particles may be used, or two or more types of them may be used.

Examples of organic particles include spherical acrylic resin fine powder, nylon resin fine powder, tetrafluoroethylene resin fine powder, crosslinked polystyrene resin fine powder, polyurethane resin fine powder, polyethylene resin fine powder, benzoguanamine resin fine powder, silicone resin fine powder, epoxy resin fine powder, polyethylene wax particles, polypropylene wax particles, and the like. Examples of inorganic particles include silica particles, zirconia particles, barium sulfate particles, titanium oxide particles, barium oxide particles, and the like. In particular, organic particles are preferable because they tend to be able to suppress damage to light guide plates used for LED backlight units; and polypropylene resin particles or urethane resin particles are more preferable.

The mean primary particle size (hereafter also referred to as "mean particle size") of the fine particles is preferably 0.5 to 20 µm. The mean particle size mentioned herein is volume mean size measured by laser diffraction. With the mean particle size of the fine particles being 0.5 µm or more, there is a tendency that irregularities can be effectively imparted to the surface of the coating layer 15. With the mean particle size of the fine particles being 20 µm or less, high light transmittance can be maintained, without using particles that are significantly larger than the thickness of the binder resin layer. The coating layer 15 preferably contains the fine particles in an amount of 0.1 to 50 parts by mass, and more preferably 2 to 20 parts by mass, relative to 100 parts by mass of the binder resin. The adhesion of the coating film can be maintained when the coating layer 15 contains the fine particles within the above range.

The coating layer 15 is not limited to a single layer structure that exhibits a light scattering function, but may be a laminate of layers that exhibit multiple functions.

The protection film 10 can be produced, for example, by a roll-to-roll method. First, a first barrier film 1 and a second barrier film 2 are separately produced. Specifically, a first vapor deposited layer 1v is laminated by vacuum deposition on the surface 1f of a first resin film 1a. Subsequently, a coating agent containing, as a main agent, an aqueous solution or water/alcohol mixed solution containing, for example, at least one component selected from the group consisting of hydroxyl group-containing polymer compounds, metal alkoxides, hydrolyzed metal alkoxides, and polymerized metal alkoxides, is applied to the surface of the first vapor deposited layer 1v, and dried, for example, at 80 to 250° C., thereby forming a gas barrier covering layer 1c. In this manner, the first barrier film 1 is obtained on which the barrier layer 1b (first vapor deposited layer 1v and gas barrier covering layer 1c) is formed on the surface 1f of the first resin film 1a. The second barrier film 2 on which the barrier layer 2b (second vapor deposited layer 2v and gas barrier covering layer 2c) is provided on the surface 2f of the second resin film 2a is obtained by performing the same operation as described above.

The protection film 10 is produced by a step of bonding together the resin film 16a for bulking and the first barrier film 1 through the first adhesion layer 11, a step of bonding together the first barrier film 1 and the second barrier film 2 through the second adhesion layer 22, and a step of forming the coating layer 15 on the outer surface of the first resin film 1a.

After two rolls of the protection film 10 having the structure shown in FIG. 1 are produced, the wavelength conversion sheet 100 is produced by a roll-to-roll method. First, a sealing resin 51, phosphors 52, and optionally a solvent, are mixed to prepare a mixture. Subsequently, the mixture is applied to the surface of the first protection film 10 on the side on which the coating layer 15 is not provided (the surface of the second resin film 2a). Then, this surface is bonded together with the surface of the second protection film 10 on the side on which the coating layer 15 is not provided (the surface of the second resin film 2a). When the sealing resin 51 is a photosensitive resin, the wavelength conversion sheet 100 is obtained by curing the photosensitive resin by irradiation with ultraviolet rays (UV curing). The photosensitive resin may be further cured by heating after UV curing. In addition to a photosensitive resin, the sealing resin 51 may be a thermosetting resin, a chemical curing resin, or the like. UV curing can be performed at 100 to 1000 mJ/cm$^2$, for example. Moreover, heat curing can be performed at 60 to 120° C. for 0.1 to 3 minutes, for example.

The first embodiment of the present disclosure is described in detail above; however, the technical scope of the present invention is not limited to the above embodiment, and various modifications can be added within a range that does not depart from the gist of the present invention. For example, the structure of the wavelength conversion sheet 100 and the structure of the protection film 10 in the above embodiment are merely examples, and these structures are not limited thereto.

In the wavelength conversion sheet of the present disclosure, the phosphor layer 50 may be sandwiched between the same protection films 10 and 10, as in the above embodiment, or may be sandwiched between protection films having different structures. Moreover, the wavelength conversion sheet may have a structure in which only one of a pair of the protection films that cover the phosphor layer 50 has a coating layer 15.

The surface of the protection film 10 on the side in contact with the phosphor layer 50 (the surface of the second resin film 2a) may be subjected to modification treatment for improving the adhesion between the protection film 10 and the phosphor layer 50, or may be provided with an easy-bonding layer or primer layer made of a urethane resin etc. Examples of the material used in the primer layer include organic polymers obtained by the reaction of polyols selected from acrylic polyol, polyvinyl acetal, polyester polyol, polyurethane polyol, etc., with isocyanate compounds; organic compounds having a urea bond obtained by the reaction of amines, polyisocyanate compounds, and water; polyethyleneimine and derivatives thereof; polyolefin-based emulsions; polyimide; melamine; phenol; inorganic fillers, such as organic modified colloidal silica; organic silane compounds, such as silane coupling agents and hydrolysates thereof; and the like.

The thickness of the primer layer after drying is generally preferably 1 to 500 nm, and more preferably 5 to 100 nm. With the thickness of the primer layer being 1 nm or more, there is a tendency that a uniform coating film is likely to be obtained. With the thickness of the primer layer being 500 nm or less, there is a tendency that the cost can be reduced. Dry curing of the primer layer can be performed, for example, at 60 to 250° C. for 1 second to 1 hour, although it is not limited thereto. Furthermore, aging may be performed after curing.

In the wavelength conversion sheet 100 shown in FIG. 1, the barrier layers 1b and 2b each have one vapor deposited layer and one gas barrier covering layer; however, the barrier layers 1b and 2b may have two or more layers of at least one of the vapor deposited layer and the gas barrier covering layer. In this case, the vapor deposited layers and the gas barrier covering layers are preferably laminated alternately.

In the wavelength conversion sheet 100 shown in FIG. 1, both end surfaces of the phosphor layer 50 (left and right end surfaces that are not covered with the protection film 10 in the drawing) may be sealed with a sealing resin, or the entire phosphor layer 50 may be covered with a sealing resin.

Figure 3:
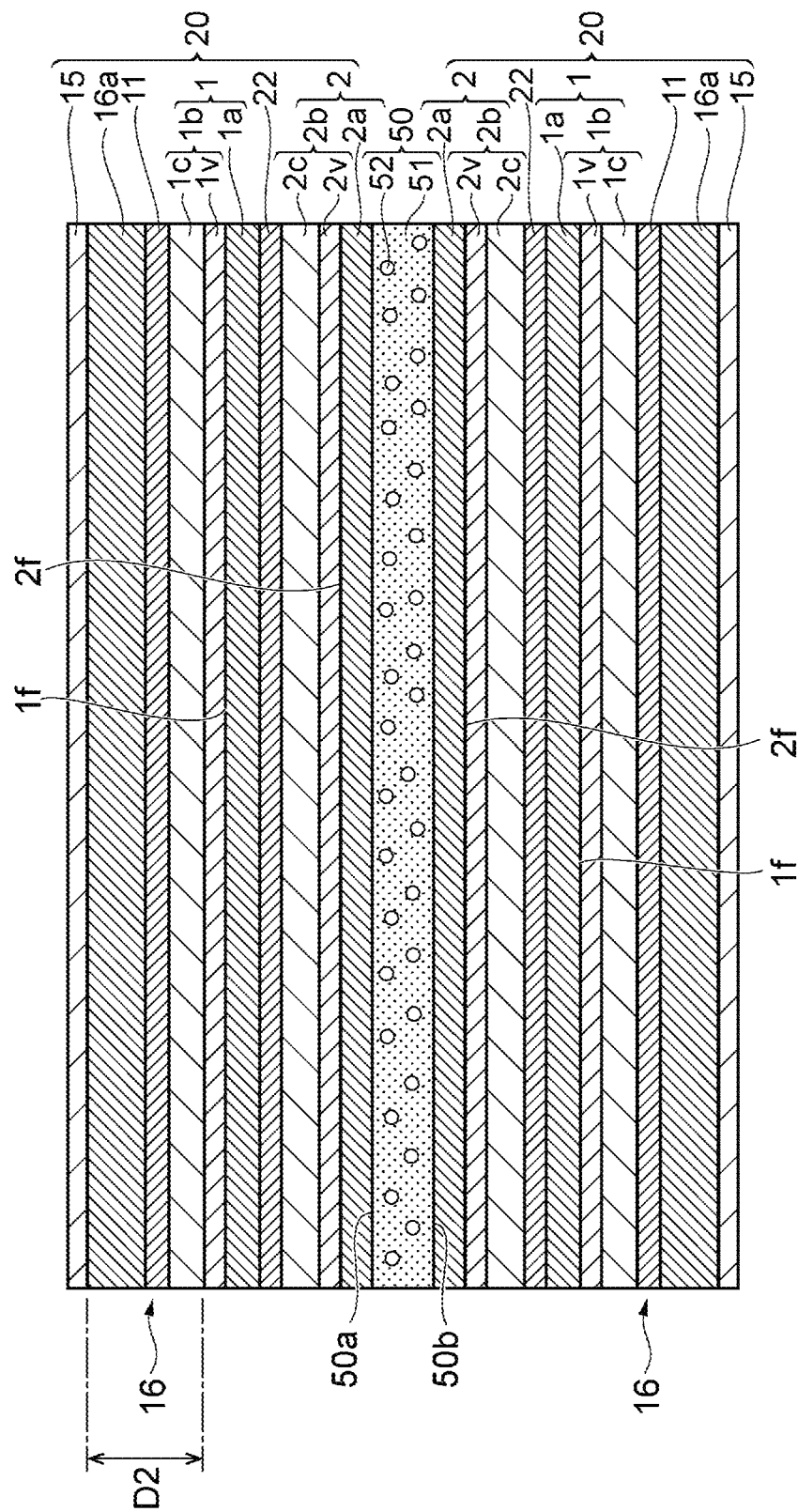
FIG. 3 is a schematic cross-sectional view showing a second embodiment of the wavelength conversion sheet of the present disclosure.

FIG. 3 is a schematic cross-sectional view showing the second embodiment of the wavelength conversion sheet of the present disclosure. The protection film 20 shown in this drawing has the same structure as that of the protection film 10 of the first embodiment, except that the front and back of the first barrier film 1 are reversed. In the second embodiment, the protection film 20 has a laminated structure, as shown in FIG. 3, and a bulking layer 16 includes a resin film 16a for bulking, a first adhesion layer 11, and a first gas barrier covering layer 1c.

The clearance (distance D2 in FIG. 3) between the coating layer 15 and the first vapor deposited layer 1v in the thickness direction of the protection film 20 is preferably 45 to 280 μm. With the clearance of 45 μm or more, the effect of making foreign substances invisible can be sufficiently ensured. With the clearance of 280 μm or less, it is easy to suppress the total thickness of the wavelength conversion sheet from overly increasing, and to suppress decrease in productivity. The upper limit of the clearance may be further selected depending on the use. For example, the clearance is more preferably 45 to 90 μm for mobile devices for which less thickness is required, and more preferably 45 to 120 μm for televisions. In the present embodiment, the bulking layer 16 has a laminated structure, as shown in FIG. 1, and includes a resin film 16a for bulking, a first adhesion layer 11, and a first resin film 1a. The thickness of the bulking layer 16 is equal to the distance D2 shown in FIG. 3.

Figure 4:
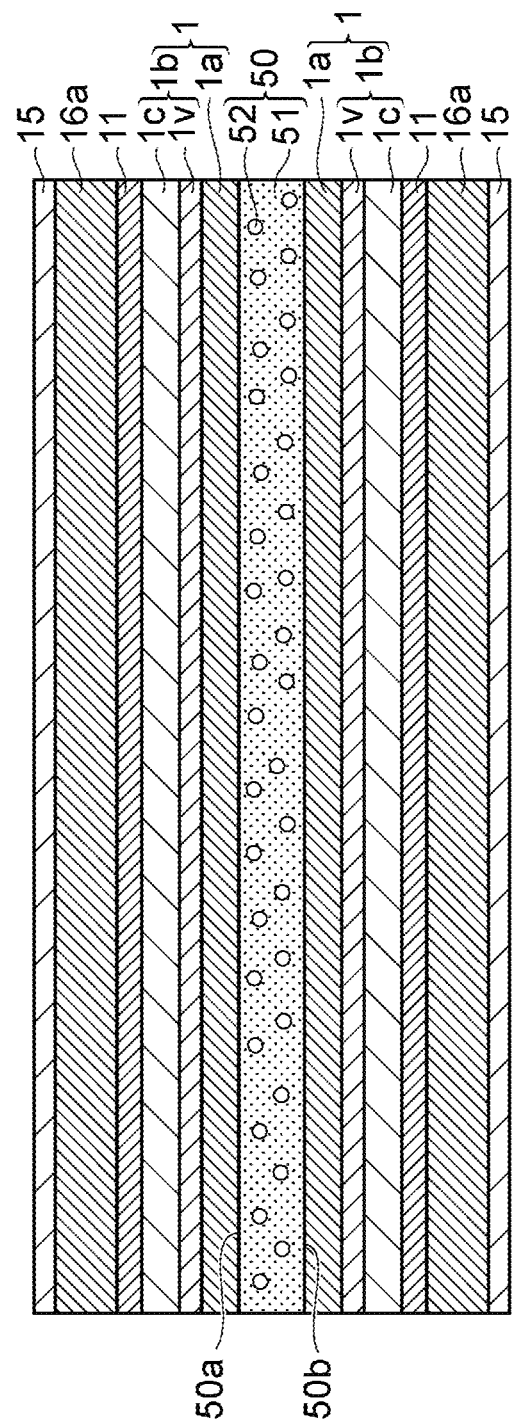
FIG. 4 is a schematic cross-sectional view showing another embodiment of the wavelength conversion sheet of the present disclosure.
Figure 5:
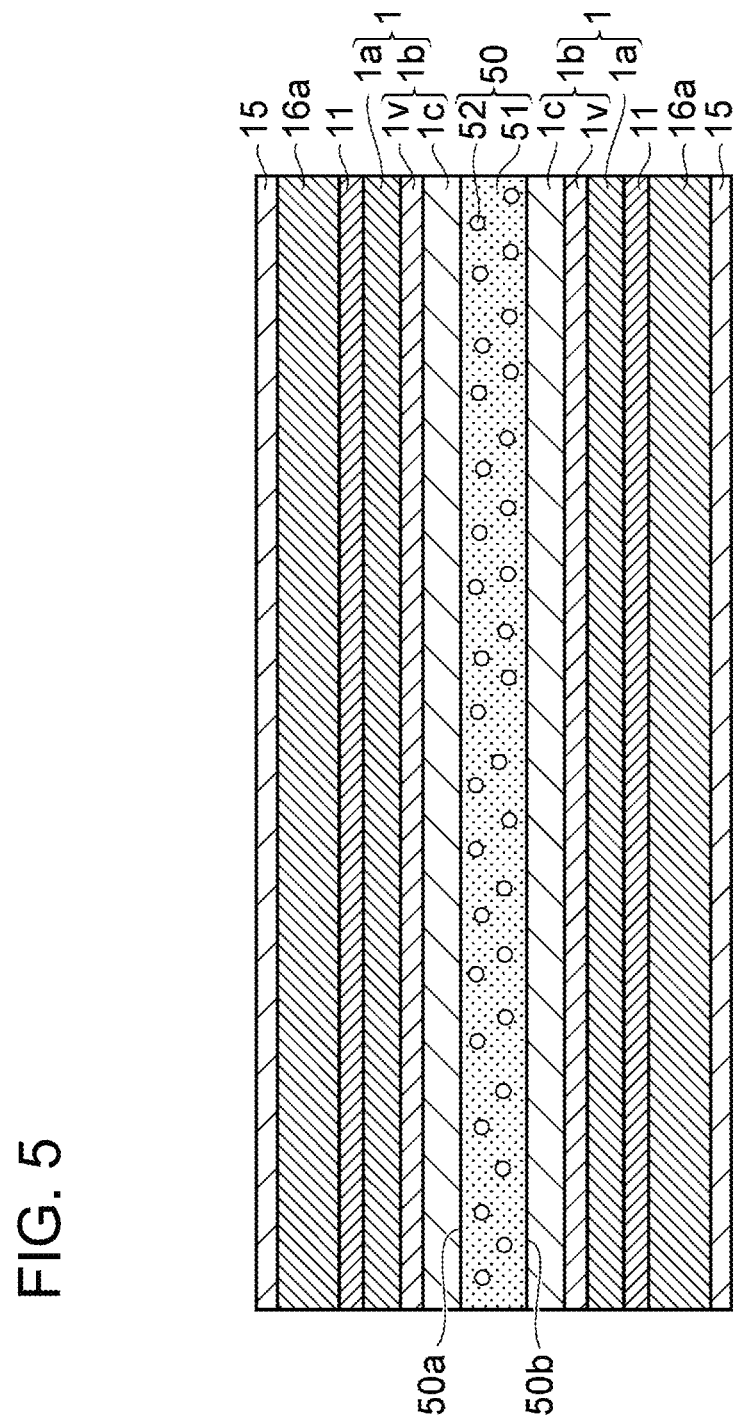
FIG. 5 is a schematic cross-sectional view showing another embodiment of the wavelength conversion sheet of the present disclosure.

The first embodiment and the second embodiment show structures in which the two barrier films 1 and 2 are bonded together, in terms of achieving excellent gas barrier properties; however, when the required gas barrier properties can be achieved with a single barrier film, the protection film of the present disclosure may be obtained by bonding together the single barrier film and the resin film for bulking. For example, as shown in FIG. 4, the protection film of the present disclosure may have a structure in which a coating layer 15, a resin film 16a for bulking, a barrier layer 1b (gas barrier covering layer 1c/vapor deposited layer 1v), and a resin film 1a are laminated in this order from outside to inside. Alternatively, as shown in FIG. 5, the protection film of the present disclosure may have a structure in which a coating layer 15, a resin film 16a for bulking, a resin film 1a, and a barrier layer 1b (vapor deposited layer 1v/gas barrier covering layer 1c) are laminated in this order from outside to inside.

EXAMPLES

The present invention is described in more detail below based on Examples and Comparative Examples; however, the present invention is not limited to the following Examples.

Example 1

A barrier film was produced in the following manner. First, an acrylic resin coating liquid was applied to one surface of a PET film having a thickness of 23 μm as a resin film and then dried to form an anchor coat layer, and silicon oxide was provided at a thickness of 30 nm as a vapor deposited layer on the anchor coat layer by vacuum deposition. Furthermore, a gas barrier covering layer having a thickness of 300 nm was formed on the vapor deposited layer. The gas barrier covering layer was formed by applying a coating liquid containing tetraethoxysilane and polyvinyl alcohol by a wet coating method. Thus, a barrier film was obtained in which a barrier layer having a vapor deposited layer and a gas barrier covering layer was provided on one surface of a resin film. A barrier film with the same structure as this barrier film was separately produced.

The two barrier films obtained as described above were bonded together. Bonding was performed using a two-part epoxy adhesive formed of an epoxy resin main agent and an amine-based curing agent, and an adhesion layer having a thickness after curing of 5 μm (oxygen permeability in an environment at 30° C. with 70% RH: 5 cm$^3$/m$^2$-day-atm) was formed, thereby producing a film in which the two barrier films were laminated so that their gas barrier covering layers faced each other. The oxygen permeability of the adhesion layer was measured in the following manner. A film of the above two-part epoxy adhesive was formed so that the thickness after curing was 5 μm on an OPP film having a thickness of 20 μm (oxygen permeability in an environment at 30° C. with 70% RH: 3000 cm$^3$/m$^2$-day-atm (measurement limit) or more) to thereby produce an evaluation sample. The oxygen permeability of the sample in an environment at 30° C. with 70% RH was measured of the method described in JIS K7126A using a differential pressure gas meter (GTR-10X, produced by GTR Tec Corporation).

Vapor deposited powders (foreign substances) on the laminated film (without a film for bulking) obtained as described above were visually observed, and their sizes were measured. Specifically, the laminated film was placed in a liquid crystal module, and the observation and size measurement of the vapor deposited powder were performed while light was emitted from below. The liquid crystal module used was one in which a reflection plate, a light guide plate, a lower diffusion plate, a lower prism sheet, an upper prism sheet, and a liquid crystal part were arranged in this order from the bottom. The liquid crystal module was configured to allow the laminated film to be placed between the lower diffusion plate and the lower prism sheet.

The eight visible vapor deposited powders shown in Table 1 were marked, and it was confirmed whether these vapor deposited powders disappeared when a resin film for bulking, described later, was superposed.

A coating layer (matt layer) having a thickness of 3 μm was formed on the surface of a PET film having a thickness of 75 μm as a resin film for bulking. The coating layer was formed by applying a coating liquid containing an acrylic resin and urethane resin particles (mean particle size: 3 μm) by a wet coating method. A resin film for bulking was superposed on the above laminated film (without a film for bulking) with the surface on which the coating layer was formed facing upward. The thickness of the bulking layer of the protection film in this Example was 98 µm (=23 µm+75 µm). The haze value of the laminate having the coating layer and the bulking layer was 38%. The haze value (%) was measured using a haze meter HM-150 (trade name, produced by Murakami Color Research Laboratory Co., Ltd.). The measurement conditions were based on JIS K7361-1.

The laminated film and the film for bulking in a superposed state were placed in the liquid crystal module, and whether the vapor deposited powder was visible was confirmed. Table 1 shows the results. In the table, "Not visible" means that the vapor deposited powder was not visible, and "Visible" means that the vapor deposited powder was visible.

Example 2

Whether the vapor deposited powder was visible was evaluated in the same manner as in Example 1, except that a PET film having a thickness of 50 µm was used as the resin film for bulking, instead of the PET film having a thickness of 75 Table 1 shows the results. The thickness of the bulking layer of the protection film in this Example was 73 µm (=23 µm+50 µm). The haze value of the laminate having the coating layer and the bulking layer was 38%.

Comparative Example 1

Figure 8:
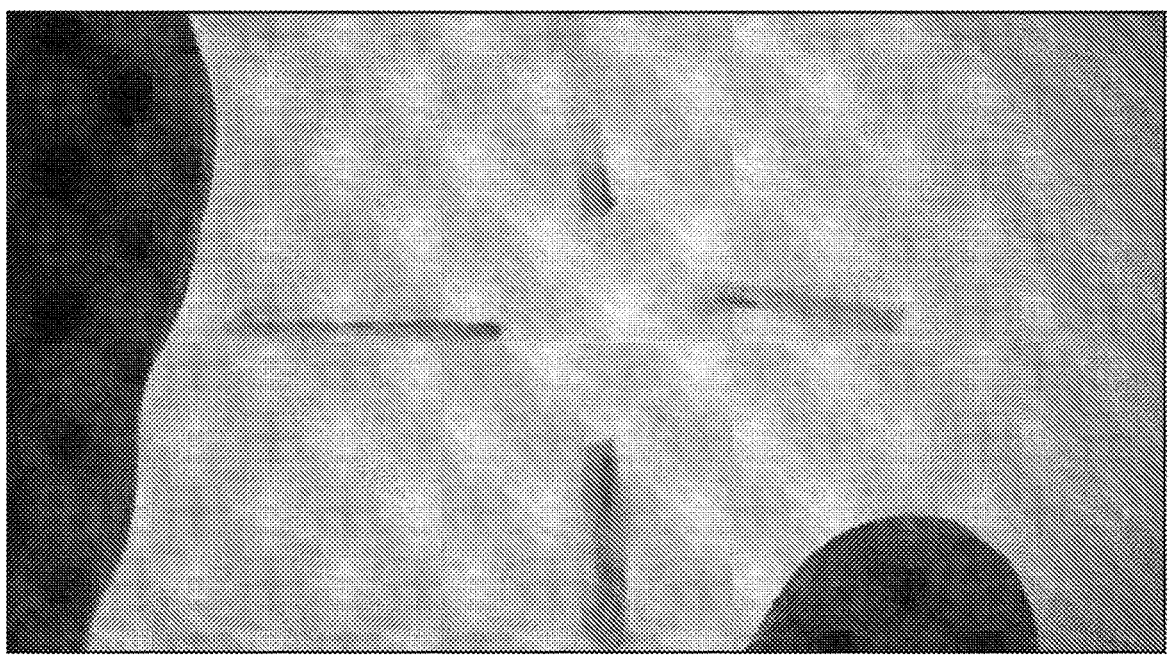
FIG. 8 is a photograph showing that the vapor deposited powder (No. 3 of Table 1) was visually recognized when a resin film for bulking having a thickness of 12 μm was superposed.

Whether the vapor deposited powder was visible was evaluated in the same manner as in Example 1, except that a PET film having a thickness of 12 µm was used as the resin film for bulking, instead of the PET film having a thickness of 75 Table 1 shows the results. The thickness of the bulking layer of the protection film in this Example was 35 µm (=23 µm+12 µm). The haze value of the laminate having the coating layer and the bulking layer was 38%.

posed. FIG. 8 shows a photograph of the vapor deposited powder (No. 3 of Table 1) that was visually recognized as foreign substances when a resin film for bulking having a thickness of 12 µm was superposed. In the photograph of FIG. 8, foreign substances were hardly visually recognized; however, with the naked eye, the vapor deposited powder No. 3 was visually recognized as a foreign substance.

Example 3

Whether the vapor deposited powders Nos. 1 to 4 shown in Table 2 were visible was evaluated in the same manner as in Example 1. Table 2 shows the results. In the table, "Not visible" means that the vapor deposited powder was not visible, "Hardly visible" means that the vapor deposited powder was hardly visible, and "Visible" means that the vapor deposited powder was visible.

Example 4

Whether the vapor deposited powders Nos. 1 to 4 shown in Table 2 were visible was evaluated in the same manner as in Example 3, except that the haze value of the laminate having the coating layer and the bulking layer was set to 30% instead of 38%. Table 2 shows the results.

Example 5

Whether the vapor deposited powders Nos. 1 to 4 shown in Table 2 were visible was evaluated in the same manner as in Example 3, except that the haze value of the laminate having the coating layer and the bulking layer was set to 20% instead of 38%. Table 2 shows the results.

Example 6

Whether the vapor deposited powders Nos. 1 to 4 shown in Table 2 were visible was evaluated in the same manner as

TABLE 1

| | Vapor deposited powder | | | Display visual recognition evaluation | | | |
|---|---|---|---|---|---|---|---|
| | | | | | Thickness of resin film for bulking | | |
| No. | Long-side length (mm) | Short-side length (mm) | Size (mm) | No resin film for bulking | 75 µm Example 1 | 50 µm Example 2 | 12 µm Comparative Example 1 |
| 1 | 1.60 | 3.80 | 2.70 | Visible | Not visible | Not visible | Visible |
| 2 | 1.32 | 3.88 | 2.60 | Visible | Not visible | Not visible | Visible |
| 3 | 0.92 | 2.15 | 1.54 | Visible | Not visible | Not visible | Visible |
| 4 | 1.38 | 0.64 | 1.01 | Visible | Not visible | Not visible | Visible |
| 5 | 0.69 | 0.60 | 0.65 | Visible | Not visible | Not visible | Visible |
| 6 | 0.47 | 0.44 | 0.46 | Visible | Not visible | Not visible | Visible |
| 7 | 0.37 | 0.37 | 0.37 | Visible | Not visible | Not visible | Visible |
| 8 | 0.18 | 0.09 | 0.14 | Visible | Not visible | Not visible | Not visible |

The "size" in the table is a value obtained by dividing the sum of the "long-side length" and "short-side length" of the vapor deposited powder by 2.

Figure 6:
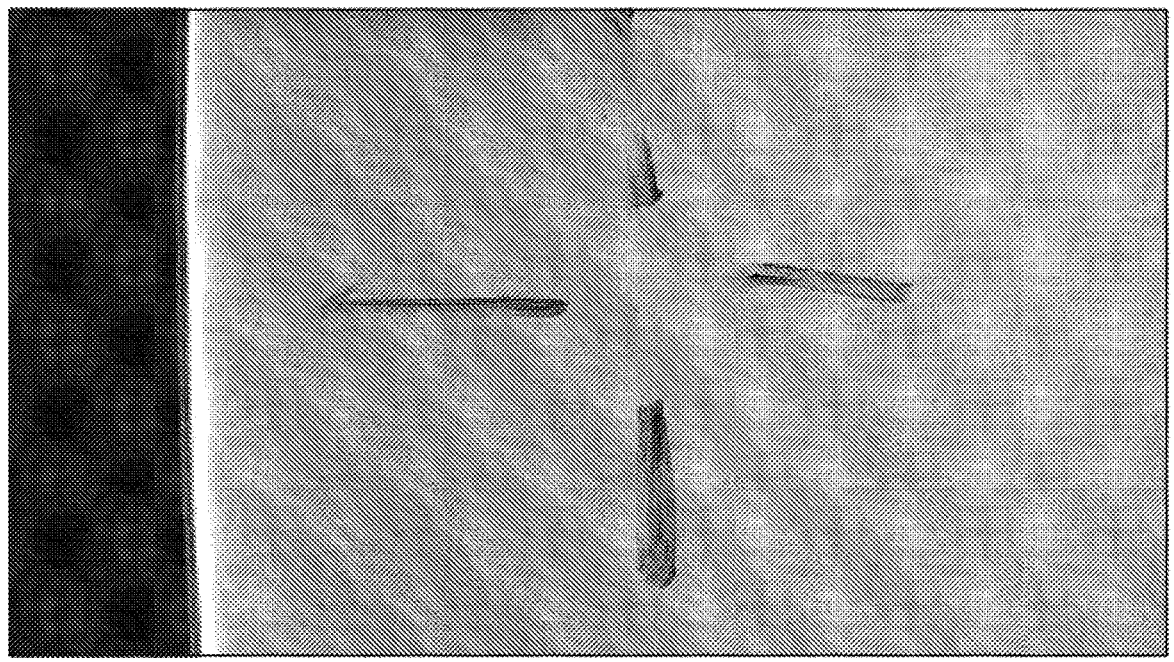
FIG. 6 is a photograph of the vapor deposited powder (No. 3 of Table 1) that was visually recognized when a resin film for bulking was not superposed.
Figure 7:
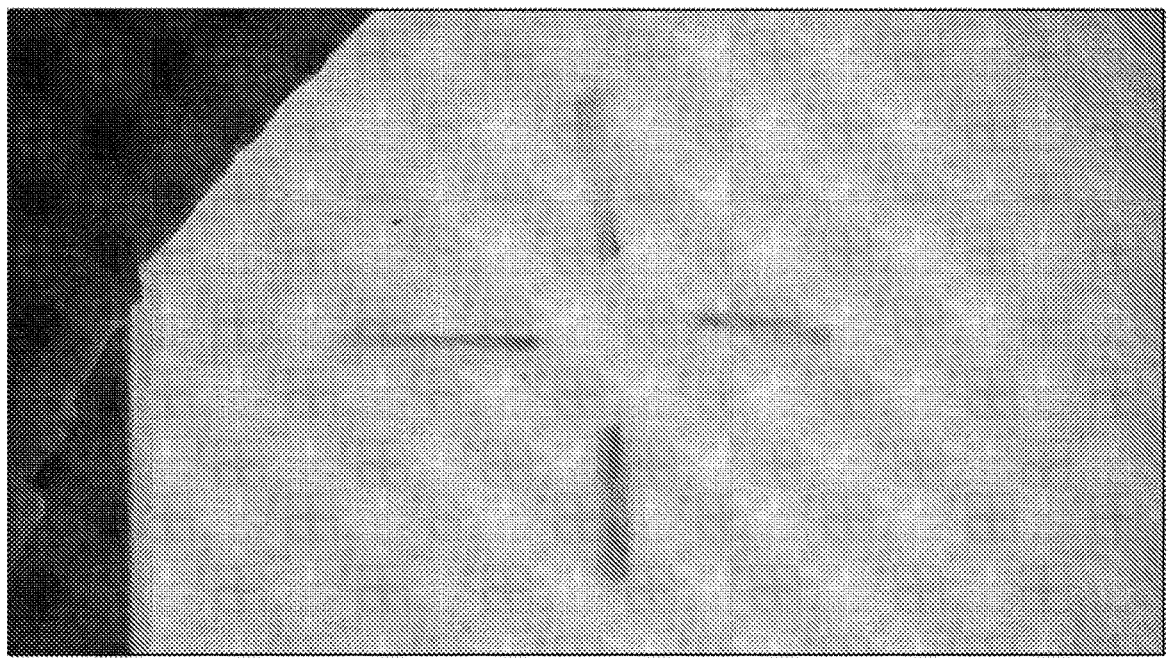
FIG. 7 is a photograph showing that the vapor deposited powder (No. 3 of Table 1) was not visible when a resin film for bulking having a thickness of 50 μm was superposed.

FIGS. 6 to 8 show photographs of the objects visually observed in "Display visual recognition evaluation" of Table 1. The four lines shown in the photographs of FIGS. 6 to 8 indicate that the vapor deposited powder (foreign substances) was present in the vapor deposited layer in the center of these lines. FIG. 6 shows a photograph of the vapor deposited powder (No. 3 of Table 1) that was visually recognized when a resin film for bulking was not superposed. FIG. 7 shows a photograph of the vapor deposited powder (No. 3 of Table 1) that was not visible when a resin film for bulking having a thickness of 50 µm was superin Example 3, except that the haze value of the laminate having the coating layer and the bulking layer was set to 10% instead of 38%. Table 2 shows the results.

Comparative Example 2

Whether the vapor deposited powders Nos. 1 to 4 shown in Table 2 were visible was evaluated in the same manner as in Example 3, except that only a resin film for bulking (thickness: 75 µm, haze value: 0%) was superposed on the barrier layer, without forming a coating layer (functional layer). Table 2 shows the results.

TABLE 2

| | Vapor deposited powder | | | Display visual recognition evaluation | | | | |
|---|---|---|---|---|---|---|---|---|
| | | | | Haze value of laminate superposed on barrier layer | | | | |
| No. | Long-side length (mm) | Short-side length (mm) | Size (mm) | 38% Example 3 | 30% Example 4 | 20% Example 5 | 10% Example 6 | 0% Comparative Example 2 |
| 1 | 0.81 | 0.54 | 0.68 | Not visible | Not visible | Not visible | Hardly visible | Visible |
| 2 | 0.54 | 0.52 | 0.53 | Not visible | Not visible | Not visible | Hardly visible | Visible |
| 3 | 0.38 | 0.38 | 0.38 | Not visible | Not visible | Not visible | Hardly visible | Visible |
| 4 | 0.19 | 0.19 | 0.19 | Not visible | Not visible | Not visible | Hardly visible | Visible |

The "size" in the table is a value obtained by dividing the sum of the "long-side length" and "short-side length" of the vapor deposited powder by 2.

Figure 9:
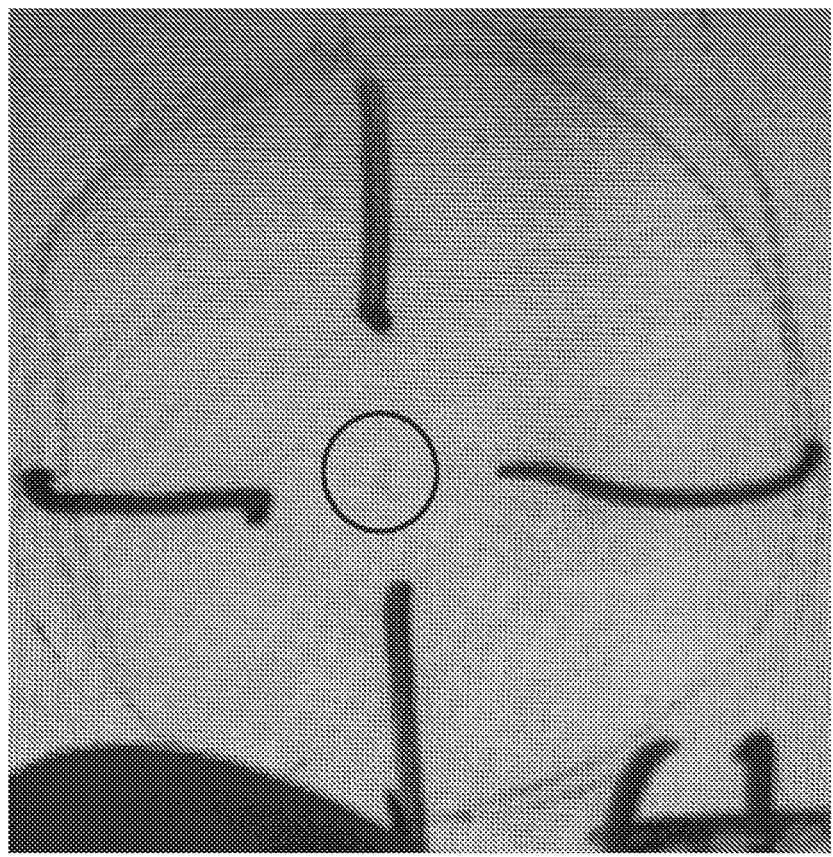
FIG. 9 is a photograph showing that the vapor deposited powder (No. 1 of Table 2) was visually recognized when a laminated film (a laminated film having a resin film for bulking and a functional layer) having a haze value of 0% was superposed.
Figure 10:
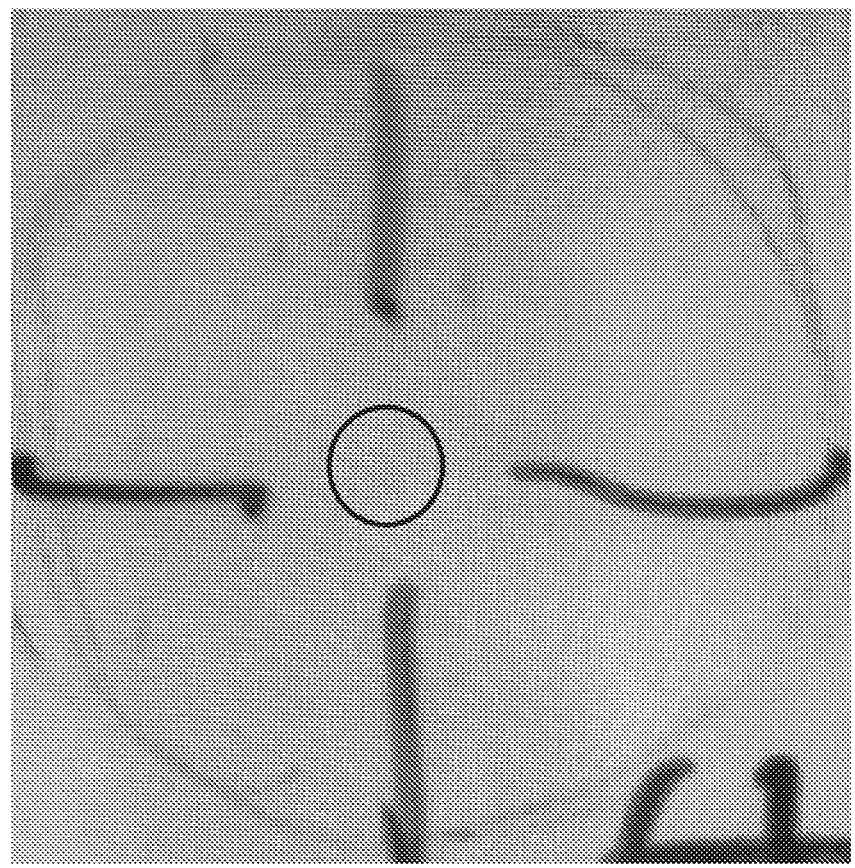
FIG. 10 is a photograph showing that the vapor deposited powder (No. 1 of Table 2) was hardly visible when a laminated film (a laminated film having a resin film for bulking and a functional layer) having a haze value of 10% was superposed.
Figure 11:
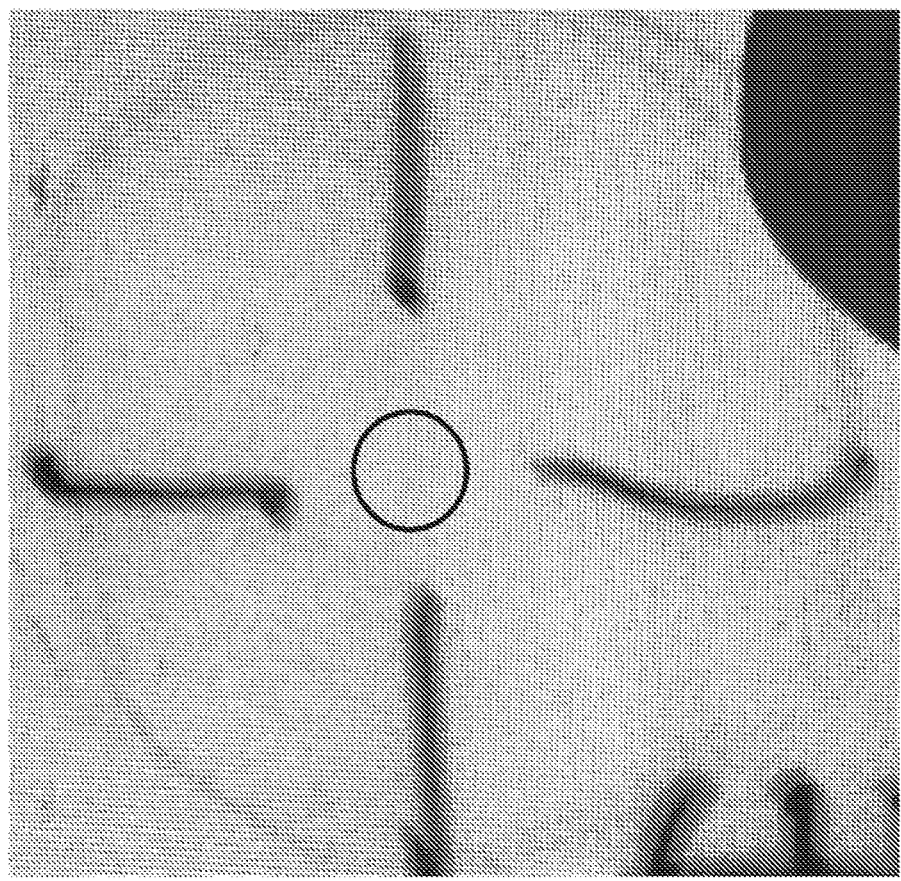
FIG. 11 is a photograph showing that the vapor deposited powder (No. 1 of Table 2) was not visible when a laminated film (a laminated film having a resin film for bulking and a functional layer) having a haze value of 20% was superposed.

FIGS. 9 to 11 show photographs of the objects visually observed in the "Display visual recognition evaluation" of Table 2. The four lines shown in the photographs of FIGS. 9 to 11 indicate that the vapor deposited powder (foreign substances) was present in the vapor deposited layer in the center of these lines (area enclosed by a circle). FIG. 9 shows a photograph of the vapor deposited powder (No. 1 of Table 2) that was visually recognized when only a resin film for bulking (thickness: 75 µm, haze value: 0%) was superposed on the barrier layer. FIG. 10 shows a photograph of the vapor deposited powder (No. 1 of Table 2) that was hardly visible when a laminate having a haze value of 10% was superposed on the barrier layer. FIG. 11 shows a photograph of the vapor deposited powder (No. 1 of Table 2) that was not visible when a laminate having a haze value of 20% was superposed on the barrier layer.

INDUSTRIAL APPLICABILITY

The present disclosure provides a phosphor protection film in which even if foreign substances, called vapor deposited powder, are present in a gas barrier layer, the foreign substances are less likely to be visually recognized as defects. Moreover, the present disclosure provides a wavelength conversion sheet including the above phosphor protection film, and a light-emitting unit including the same.

REFERENCE SIGNS LIST

1 . . . First barrier film; 1a . . . First resin film; 1b . . . First barrier layer; 1c . . . First gas barrier covering layer; 1v . . . First vapor deposited layer; 2 . . . Second barrier film; 2a . . . Second resin film; 2b . . . Second barrier layer; 2c . . . Second gas barrier covering layer; 2v . . . Second vapor deposited layer; 10, 20 . . . Protection film (phosphor protection film); 11 . . . First adhesion layer; 15 . . . Coating layer (functional layer); 16 . . . Bulking layer; 16a . . . Resin film for bulking; 22 . . . Second adhesion layer; 50 . . . Phosphor layer; 52 . . . Phosphor; 100 . . . Wavelength conversion sheet; 200 . . . Backlight unit (light-emitting unit); G . . . Light guide plate; L . . . Light source.

What is claimed is:

1. A phosphor protection film for protecting a phosphor contained in a phosphor layer, comprising:
a functional layer, which is an outermost layer of the phosphor protection film;
a bulking layer that has a laminated structure, wherein the bulking layer further comprises a resin film for bulking, a first barrier film, a first adhesion layer that bonds together the resin film for bulking and the first barrier film, wherein the first barrier film comprises a first resin film; and
a first vapor deposited layer that has gas barrier properties, a first side of the first vapor deposited layer faces a second side of the bulking layer, the second side of the bulking layer is opposite to the first side of the bulking layer that faces the functional layer, a second side of the first vapor deposited layer is opposite to the first side of the vapor deposited layer; the second side of the vapor deposited layer faces the phosphor layer that contains the phosphor,
wherein a clearance between the functional layer and the first vapor deposited layer in a thickness direction of the phosphor protection film is 45 to 280 µm and wherein a laminate consisting of the functional layer and the bulking layer has a haze value from 10% to 20% and wherein the functional layer consists of a binder resin, which is an acrylic polymer, and fine particles.

2. The phosphor protection film of claim 1, wherein the resin film for bulking has a thickness of 10 to 250 µm.

3. The phosphor protection film of claim 2, wherein the first vapor deposited layer is formed on an outer surface of the first resin film.

4. The phosphor protection film of claim 1, wherein the first adhesion layer has an oxygen permeability of 1000 cm$^3$/(m$^2$-day-atm) or less at a thickness of 5 µm.

5. The phosphor protection film of claim 1, further comprising:
a second adhesion layer facing the first vapor deposited layer;
a second vapor deposited layer that has gas barrier properties; and
a second resin film facing the phosphor layer that contains the phosphor, the second vapor deposited layer is between the second adhesion layer and the second resin film.

6. The phosphor protection film of claim 5, wherein the second adhesion layer has an oxygen permeability of 1000 cm$^3$/(m$^2$-day-atm) or less at a thickness of 5 µm.

7. The phosphor protection film of claim 1, wherein the functional layer has at least one function selected from the group consisting of an interference fringe prevention function, an antireflection function, a light scattering function, an antistatic function, and a damage prevention function.

8. A wavelength conversion sheet, comprising:
a first protection film having the phosphor protection film of claim 1;
a phosphor layer containing a phosphor; and
a second protection film having the phosphor protection film of claim 1, wherein the phosphor layer is laminated between the first protection film and the second protection film and wherein the functional layer of the first protection film and the functional layer of the first protection film are two opposite outermost layers of the wavelength conversion sheet.

9. A light-emitting unit, comprising: a light source, a light guide plate, and the wavelength conversion sheet of claim 8.

10. The phosphor protection film of claim 1, wherein the bulking layer further comprises an anchor coat layer.

11. The phosphor protection film of claim 10, wherein the anchor coat layer comprises an acrylic resin layer, a polyester resin layer, or a urethane resin layer.

12. The phosphor protection film of claim 1, wherein the first adhesion layer comprises an epoxy resin main agent and an amine-based curing agent.

13. The phosphor protection film of claim 5, wherein the thickness of the second resin film is less than the thickness of the first resin film, wherein the thickness of the first resin film is from about 9 to 50 μm, and wherein the thickness of the second resin film is 40 μm or less.

14. The phosphor protection film of claim 1, wherein the laminate consisting of the functional layer and the bulking layer has the haze value from 20% to 38%.

15. The phosphor protection film of claim 1, wherein the fine particles are polypropylene resin particles or urethane resin particles.

16. The phosphor protection film of claim 1, wherein the first vapor deposited layer is formed directly on the first resin film.

17. The phosphor protection film of claim 16, further comprising a first gas barrier covering layer on the first vapor deposited layer opposite to the first resin film, the first gas barrier covering layer comprises a hydroxyl group containing polymer and a metal alkoxide.

18. The phosphor protection film of claim 17, wherein the hydroxyl group containing polymer is polyvinyl alcohol and the metal alkoxide is tetraethoxysilane.

* * * * *